3,778,422
PROCESS FOR THE PRODUCTION OF VINYL HALIDE POLYMERS

Elliott Farber, Trenton, and Milton K. Rosen and Ashok C. Shah, Flemington, N.J., assignors to Tenneco Chemicals, Inc.
No Drawing. Filed May 17, 1971, Ser. No. 144,417
Int. Cl. C08f 3/22
U.S. Cl. 260—92.8 W       10 Claims

ABSTRACT OF THE DISCLOSURE

The polymerization of vinyl halide is carried out in an aqueous medium in the presence of an organic peroxydicarbonate and a very small amount of an alkyl hydroperoxide.

---

This invention relates to a process for the production of vinyl halide polymers. More particularly, it relates to an improved suspension polymerization process in which vinyl halide monomers are polymerized in the presence of an initiator that comprises an organic peroxydicarbonate.

Organic peroxydicarbonates are widely used as the free radical generating polymerization initiator in the production of vinyl halide polymers in a suspension or emulsion polymerization system. When these initiators are used in polymerizations that are carried out at temperatures above about 100° F., the rate at which the vinyl halide polymerizes increases rapidly as the reaction proceeds. This autoacceleration of the rate of polymerization has been attributed to the polymerization of the monomer within the precipitated polymer particles where the usual free radical termination reactions are inhibited. If the autoacceleration liberates heat at a rate which exceeds the system's heat transfer cooling capabilities, it produces a rise in the reaction temperature which is commonly called a "heat-kick." Because the molecular weight, branching, heat stability, and other properties of vinyl halide polymers are affected by the temperature at which the polymerization is carried out, a relatively constant polymerization temperature is necessary if a uniform product is to be obtained. It is therefore necessary to control the temperature at which the polymerization takes place and to prevent or inhibit heat-kick during the polymerization.

A number of methods have been suggested for overcoming the problem of heat-kick that occurs when a vinyl halide is polymerized in the presence of a peroxydicarbonate polymerization initiator, but none has proven to be entirely satisfactory. For example, it has been suggested that the cooling capacity of the polymerization system be greatly expanded to enable it to remove rapidly the heat that is generated by the exothermic polymerization reaction. This method is unsatisfactory because it requires the use of large and costly refrigeration plants. Smith in U.S. Pat. No. 3,022,281 indicated that the rate of polymerization of vinyl chloride in a system in which an organic peroxydicarbonate is used as the polymerization initiator can be controlled by adjusting the concentration of the reactants used to form the peroxydicarbonate in situ. In U.S. Pat. No. 3,022,282, Marous et al. taught that the rate of polymerization of vinyl chloride can be controlled by using very small quantities of the peroxydicarbonates to initiate the polymerization reaction. These procedures, however, do not provide sufficient control of the polymerization when it is carried out on a large scale. In addition, the products formed by these procedures often do not have the granular form that is preferred for the commercial grades of polyvinyl chloride.

In accordance with this invention, it has been found that the tendency of vinyl halides and mixtures of monomers that contain a major amount of a vinyl halide to undergo heat kicks in an aqueous system in the presence of a peroxydicarbonate initiator can be eliminated or substantially reduced by incorporating in the polymerization mixture a very small amount of an alkyl hydroperoxide. When the polymerization reaction is carried out in this way, the reaction temperature remains relatively constant through the polymerization, and an increased conversion of monomer to polymer is obtained in a shorter time than is possible when the polymerization is carried out in the absence of the alkyl hydroperoxide. In addition because the temperature is held within a narrow range during the polymerization, the polymer obtained is more uniform in molecular weight and molecular structure than are polymers obtained by the previously known processes.

The alkyl hydroperoxides that can be used as the polymerization initiator in the process of this invention are those having from 2 to 8 carbon atoms. These include ethyl hydroperoxide, n-propyl hydroperoxide, isopropyl hydroperoxide, n-butyl hydroperoxide, sec. butyl hydroperoxide, tert. butyl hydroperoxide, n-amyl hydroperoxide, sec. amyl hydroperoxide, tert. amyl hydroperoxide, n-hexyl hydroperoxide, n-octyl hydroperoxide, 2-ethylhexyl hydroperoxide, and mixtures thereof. The preferred hydroperoxides are those having a tertiary alkyl group, such as tert. butyl hydroperoxide and tert. amyl hydroperoxide.

To minimize heat-kick and to achieve the desired control of the polymerization temperature, at least 0.001 part by weight of the alkyl hydroperoxide per part by weight of the peroxydicarbonate initiator is added to the polymerization mixture. In most cases about 0.0003 part to 0.1 part by weight of the alkyl hydroperoxide is used per part by weight of peroxydicarbonate. Larger amounts of the hydroperoxide can be used, but their use usually does not result in a corresponding improvement in the control of the polymerization reaction or in the properties of the product.

The organic peroxydicarbonates that are used as free radical generating polymerization initiators are esters that have from 1 to 18 carbon atoms in each of the terminal ester groups. They may be represented by the structural formula

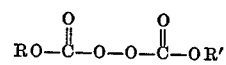

wherein R and R' are radicals that are derived from alcohols having from 1 to 18 carbon atoms and that are attached to the oxygen atoms by a carbon atom. R and R' may represent the present group or different groups. They may be alkyl, alkenyl, aryl, aralkyl, cycloalkyl, or heterocyclic groups; for example, R and R' may be methyl, ethyl, n-propyl, isopropyl, n-butyl, sec. butyl, tert. butyl, n-amyl, tert. amyl, hexyl, 2-ethylhexyl, lauryl, stearyl, allyl, methallyl, crotyl, vinyl, propargyl, 2-chloroallyl, 2-nitro-2-methylpropyl, phenyl, chlorophenyl, benzyl, cyclohexyl, cycloheptyl, cinnamyl, tetrahydrofurfuryl, or the like. The preferred initiators are dialkyl peroxydicarbonates in which each alkyl group has from 2 to 8 carbon atoms. The peroxydicarbonate may be used as the sole initiator in the polymerization, or it may be used in combination with an organic peroxide, such as lauroyl peroxide. The peroxydicarbonates may be added as such to the aqueous medium in which the polymerization is to take place, or they may be formed in situ during the polymerization by the reaction of a chloroformate ester of a monohydric alcohol with hydrogen peroxide in the presence of sodium hydroxide.

The polymerization mixture that is used in the practice of this invention usually contains about 0.005 percent to 1 percent of one of the aforementioned peroxydicarbonate esters and 0.00001 percent to 0.1 percent of an alkyl hydroperoxide, based on the weight of the monomer component. Particularly satisfactory results have been obtained using polymerization mixtures that contain 0.01 percent to 0.1 percent of a dialkyl peroxydicarbonate and 0.00001 percent to 0.005 percent of an alkyl hydroperoxide, based on the weight of the monomer component.

The process of this invention may be used in the production of vinyl halide homopolymers as well as polymers formed by the copolymerization of a vinyl halide with an essentially water-insoluble ethylenically-unsaturated monomer that is copolymerizable therewith. The vinyl halide is ordinarily and preferably vinyl chloride, but the bromide, fluoride, and iodide can also be used. Suitable comonomers include vinyl acetate, vinyl propionate, vinyl stearate, vinyl benzoate, styrene, methyl methacrylate, ethyl acrylate, allyl acrylate, acrylamide, acrylonitrile, methacrylonitrile, vinylidene chloride, dialkyl fumarates and maleates, vinyl ethers, olefins, and the like. When one or more of the aforementioned comonomers is used, the monomer component contains at least 70 percent by weight of the vinyl halide. It is preferred that the monomer component consist essentially of vinyl chloride or contain about 80 percent to 90 percent by weight of vinyl chloride and 10 percent to 20 percent by weight of vinyl acetate.

The polymerization reactions of this invention are carried out in the conventional manner using the well-known emulsion or suspension polymerization techniques. The monomer component is polymerized in an aqueous medium at a temperature in the range of about 80° F. to 160° F., and preferably 110° F. to 140° F., in the presence of the aforementioned amounts of an organic peroxydicarbonate and an alkyl hydroperoxide. The polymerization system may also contain about 0.02 percent to 1.5 percent, based on the weight of the monomer component, of a suspending agent such as methylcellulose, gelatin, or hydrolyzed polyvinyl acetate, about 0.001 to 0.50 percent, based on the weight of the monomer component, of a secondary emulsifier, and about 0.01 percent to 0.1 percent, based on the weight of the monomer component, of sodium bicarbonate. The polymerization is continued until the pressure within the reactor has dropped to a value that is normally about 90 p.s.i.g. The vinyl halide polymer is then separated from the polymerization mixture and dried. Additives, such as plasticizers, heat and light stabilizers, pigments, fillers, and the like, may be added in the amounts ordinarily used for these purposes to modify the properties of the polymers.

The invention is further illustrated by the examples that follow. In these examples, all parts are parts by weight.

EXAMPLE 1

The polymerization of vinyl chloride was carried out by the following procedure in an autoclave that was equipped with an agitator and a jacket through which water was circulated as the cooling medium.

Water (175 parts), sodium bicarbonate (0.025 part), and methylcellulose (Methocel 15) (0.15 part) were charged to the autoclave. The autoclave was evacuated. Then 0.0361 part of di-sec. butyl peroxydicarbonate, 0.0018 part of tert. butyl hydroperoxide, and 100 parts of vinyl chloride were added to the mixture in the autoclave.

The temperature of the stirred polymerization mixture was brought to 132° F. and was maintained at this level by regulating the temperature of the water that was circulating through the jacket of the autoclave. The polymerization was continued until the pressure in the autoclave was 90 p.s.i.g. at 132° F. This required a reaction period of 7.5 hours. During the polymerization, the temperature of the cooling water that was circulated through the jacket of the autoclave to maintain the reaction temperature at 132° F. was recorded at frequent intervals. The data obtained are summarized in Table I.

From previous correlations between polymerizations in the autoclave used in this experiment and in larger commercial-size autoclaves, it was known that at a reaction temperature of 132° F. if the temperature of the water in the jacket of the experimental autoclave used in Example 1 falls appreciably below 112° F., heat-kick will develop when the same polymerization reaction is carried out in a commercial-size autoclave.

From the data in Table I, it will be seen that the polymerization took place at a relatively uniform rate. The fact that the temperature of the cooling water required to maintain the reaction temperature at 132° F. dropped only to 110° F. indicates that little or no heat-kick would be expected when the same polymerization reaction is carried out in a larger autoclave.

COMPARATIVE EXAMPLE A

The polymerization reaction described in Example 1 was repeated using a polymerization mixture that did not contain tert. butyl hydroperoxide. During the polymerization, the temperature of the cooling water that was required to maintain the reaction temperature at 132° F. was recorded at frequent intervals. The data obtained are summarized in Table I.

From these data it will be seen that the temperature of the cooling water dropped below 112° F. in less than 5 hours and that it had reached 95° F. in 5.5 hours. This indicates that the reaction called for an amount of cooling that is beyond the cooling capacity of a typical commercial reactor. This reaction would therefore generate appreciable heat-kick in a large reactor.

TABLE I

| | Temperature of water in autoclave jacket required to maintain reaction temperature at 132° F. | |
|---|---|---|
| | Example 1, ° F. | Comparative Example A, ° F. |
| Reaction time (hours): | | |
| 0 | 130 | 131 |
| 1 | 118 | 124.5 |
| 2 | 114 | 120 |
| 3 | 112 | 117 |
| 4 | 111.5 | 114.5 |
| 5 | 111 | 109 |
| 5.5 | 110 | 95 |
| 6 | 117.5 | 110 |
| 7 | 125 | 126 |
| 7.5 | 127.5 | 129.5 |

EXAMPLE 2

To a jacketed autoclave were charged 166 parts of water, 0.0122 part of sodium bicarbonate, 0.1 part of methylcellulose (Methocel 15), and 0.025 part of diisopropyl peroxydicarbonate. The autoclave was evacuated, and then 0.000075 part of tert. butyl hydroperoxide and 100 parts of vinyl chloride were added to the mixture in the autoclave.

The temperature of the stirred polymerization mixture was brought to 124° F. and maintained at this level by regulating the temperature of the water that was circulating through the jacket of the autoclave. The polymerization was continued for 8 hours, the time required for the pressure in the autoclave to fall to 74 p.s.i.g. at 124° F.

After an additional two hours at 124° F., the pressure in the autoclave was 70 p.s.i.g.

During the polymerization, the temperature of the cooling water was recorded at frequent intervals. The data obtained are summarized in Table II.

From previous correlations between polymerizations in the autoclave used in this experiment and in commercial-size autoclaves, it was known that at a reaction temperature of 124° F. if the temperature of the water in the jacket of the experimental autoclave used in Example 2 falls appreciably below 104° F., heat-kick will develop when the same polymerization is carried out in a commercial-size autoclave.

From the data in Table II it will be seen that the temperature of the cooling water fell eleven degrees below 104° F. Therefore, a small heat-kick would be expected when the same polymerization is carried out in a large autoclave.

COMPARATIVE EXAMPLE B

The polymerization reaction described in Example 2 was repeated using a polymerization mixture that did not contain tert. butyl hydroperoxide. The polymerization was carried out at 124° F. until the pressure in the autoclave had dropped to 80 p.s.i.g. This required 8 hours. After an additional two hours at 124° F., the pressure was still 80 p.s.i.g.

During the polymerization, the temperature of the cooling water that was required to maintain the reaction temperature at 124° F. was recorded at frequent intervals. The data obtained are summarized in Table II.

From these data, it will be seen that the temperature of the cooling water was below 104° F. in less than 6 hours and that it had fallen to 72° F. in 6.7 hours. This indicates that when the same reaction is carried out in a large autoclave an uncontrollable heat-kick will be expected after the reaction has proceeded for about 6 hours.

The fact that after a 10 hour reaction period the pressure in the autoclave was 70 p.s.i.g. in Example 2 and 80 p.s.i.g. in Comparative Example B indicates that the conversion of monomer to polymer in Example 2 was higher than that in the comparative example. Thus, the addition to the polymerization mixture of 0.000075 part of tert. butyl hydroperoxide per 100 parts of vinyl chloride not only brings about better control of the polymerization reaction, but it also results in a higher conversion of monomer to polymer in a given time.

TABLE II

| | Temperature of water in autoclave jacket required to maintain reaction temperature at 124° F. | |
|---|---|---|
| | Example 2, ° F. | Comparative Example B, ° F. |
| Reaction time (hours): | | |
| 0 | 124 | 124 |
| 1 | 118 | 118 |
| 2 | 116 | 113 |
| 3 | 115 | 112 |
| 4 | 114 | 110 |
| 5 | 112 | 108 |
| 6 | 108 | 100 |
| 6.4 | 104 | 76 |
| 6.7 | 98 | 72 |
| 7.0 | 96 | 75 |
| 7.3 | 93 | 85 |
| 7.7 | 104 | 104 |
| 8 | 112 | 116 |
| 9 | 118 | 118 |
| 10 | 120 | 120 |

EXAMPLE 3

To a jacketed autoclave were charged 170 parts of water, 0.0126 part of hydrogen peroxide, and 0.0224 part of sodium hydroxide to form a solution having a pH of 9. The autoclave was evacuated. Then after the addition of 0.056 part of ethyl chloroformate and 0.15 part of methylcellulose (Methocel 15) 100 parts of vinyl chloride was pumped into the autoclave. The polymerization mixture was brought to 122° F. and maintained at this level by regulating the temperature of the water that was circulating through the jacket of the autoclave. After 3 hours at 122° F., 0.00075 part of tertiary butyl hydroperoxide was added to the reaction mixture. After an additional 4.75 hours, the pressure in the autoclave had dropped to 90 p.s.i.g. at 122° F.

During the polymerization, the temperature of the cooling water was recored at frequent intervals. The data obtained are summarized in Table III.

From previous correlations between polymerizations in the autoclave used in this experiment and in commercial-size autoclaves, it was known that at a reaction temperature of 122° F. if the temperature of the water in the jacket of the experimental autoclave used in Example 3 falls below 105° F., a heat-kick will develop when the same polymerization is carried out in a large autoclave.

From the data in Table III, it will be seen that the temperature of the cooling water did not go appreciably below 105° F. during the polymerization. A very small heat-kick would therefore be expected when the same polymerization is carried out in a large autoclave.

COMPARATIVE EXAMPLE C

The polymerization reaction described in Example 3 was repeated using a polymerization mixture that did not contain tert. butyl hydroperoxide. The polymerization was carried out at 122° F. until the pressure in the autoclave had dropped to 90 p.s.i.g. at 122° F. This required 7.75 hours. During the polymerization, the temperature of the cooling water that was required to maintain the reaction temperature at 122° F. was recorded at frequent intervals. The data obtained are summarized in Table III.

From the data in Table III, it will be seen that the temperature of the cooling water was below 105° F. after 7 hours and that it had fallen to 90° F. in 7.75 hours. This indicates that when the same reaction is carried out in a large autoclave uncontrollable heat-kick will be expected after the reaction has proceeded for about 7 hours.

TABLE III

| | Temperature of water in autoclave jacket required to maintain reaction temperature at 132° F. | |
|---|---|---|
| | Example 3, ° F. | Comparative Example A, ° F. |
| Reaction time (hours): | | |
| 0 | 120 | 120 |
| 1 | 115 | 117 |
| 2 | 112 | 115 |
| 3 | 111 | 113 |
| 4 | 110 | 112 |
| 5 | 108 | 110 |
| 6 | 106 | 109 |
| 7 | 104 | 103 |
| 7.5 | 102 | 95 |
| 7.75 | 108 | 90 |
| 8 | 110 | 93 |

Each of the other alkyl hydroperoxides herein disclosed can also be used to control the rate of polymerization of vinyl halides in the presence of a peroxydicarbonate initiator and to prevent or minimize heat-kick during their polymerization in an aqueous medium.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. In the process for the polymerization of a monomer component that comprises a vinyl halide in an aqueous medium at a temperature in the range of 80° F. to 160° F. in the presence of 0.005 percent to 1 percent, based on the weight of the monomer component, of a polymerization initiator comprising an organic peroxydicarbonate ester having from 1 to 18 carbon atoms in each of the terminal ester groups, the improvement consisting essentially of carrying out the polymerization in the presence of 0.00001 percent to 0.1 percent, based on the weight of the monomer component, of an alkyl hydroperoxide having from 2 to 8 carbon atoms.

2. The process of claim 1 wherein the polymerization is carried out in the presence of 0.01 percent to 0.1 percent, based on the weight of the monomer component, of said organic peroxydicarbonate ester and 0.00001 percent to 0.005 percent, based on the weight of the monomer component, of said alkyl hydroperoxide.

3. The process of claim 1 wherein the alkyl hydroperoxide is a tertiary alkyl hydroperoxide having 4 to 5 carbon atoms.

4. The process of claim 3 wherein the alkyl hydroperoxide is tertiary butyl hydroperoxide.

5. The process of claim 2 wherein the dialkyl peroxydicarbonate is diisopropyl peroxydicarbonate.

6. The process of claim 2 wherein the dialkyl peroxydicarbonate is di-sec. butyl peroxydicarbonate.

7. The process of claim 2 wherein the dialkyl peroxydicarbonate is diethyl peroxydicarbonate.

8. The process of claim 2 wherein the dialkyl peroxydicarbonate is di-2-ethylhexyl peroxydicarbonate.

9. The process of claim 1 wherein the dialkyl peroxydicarbonate is formed in situ by the reaction of an alkyl chloroformate with hydrogen peroxide and sodium hydroxide during the course of the polymerization.

10. The process of claim 1 wherein the monomer component consists essentially of vinyl chloride.

References Cited
UNITED STATES PATENTS

Re. 25,763  4/1965  Marous et al. ____ 260—92.8 W
3,575,945   4/1971  Cantoni et al. ____ 260—92.8 W JOSEPH L. SCHOFER, Primary Examiner R. S. BENJAMIN, Assistant Examiner U.S. Cl. X.R.

260—85.5 XA, 86.3, 87.5 C, R, G, 87.7